United States Patent [19]

Harrington

[11] 4,418,579

[45] Dec. 6, 1983

[54] FLUID FLOW MONITORS

[75] Inventor: Peter F. Harrington, Ashby-de-la-Zouch, United Kingdom

[73] Assignee: Coal Industry (Patents) Limited, London, England

[21] Appl. No.: 215,906

[22] Filed: Dec. 12, 1980

[30] Foreign Application Priority Data

Dec. 21, 1979 [GB] United Kingdom ............... 79/44212
Jun. 13, 1980 [GB] United Kingdom ............... 80/19351
Jan. 18, 1980 [GB] United Kingdom ............... 80/01698

[51] Int. Cl.³ .............................................. G01F 1/32
[52] U.S. Cl. ............................................... 73/861.23
[58] Field of Search ............ 73/861.22, 861.23, 861.24

[56] References Cited

U.S. PATENT DOCUMENTS

| 3,680,375 | 8/1972 | Joy et al. ......................... 73/861.23 |
| 3,796,096 | 3/1974 | Sielaff et al. ..................... 73/861.24 |
| 3,903,742 | 9/1975 | Colton ............................. 73/861.23 |
| 3,940,986 | 3/1976 | Yamasaki et al. ................ 73/861.23 |

FOREIGN PATENT DOCUMENTS

| 1511591 | 5/1978 | United Kingdom . |
| 1511592 | 5/1978 | United Kingdom . |
| 2002520 | 2/1979 | United Kingdom . |
| 2012421 | 7/1979 | United Kingdom . |
| 2020022 | 11/1979 | United Kingdom . |
| 1561783 | 3/1980 | United Kingdom . |

Primary Examiner—Herbert Goldstein
Attorney, Agent, or Firm—James C. Wray

[57] ABSTRACT

A fluid flow monitor of the sort which detects of rate of formation of Karman vortices caused by a vortex inducing element in a fluid flow along a passage is provided with at least one formation associated with at least one side of the passage and tending to interfere with fluid flow along the passage, the formation being provided on the downstream side of the vortex inducing element.

14 Claims, 10 Drawing Figures

FLUID FLOW MONITORS

The present invention concerns improvements in or relating to fluid flow monitors.

Fluid flow monitors detect movement of liquids or gases such as air and may use, for example, Pitot or Venturi tubes. Such monitors are often not entirely satisfactory because they require reading corrections to be made to allow for variations in the fluid away from calibration standard, for example, variations in atmospheric properties away from sea level.

Other types of monitor may employ a vane which is disturbed by relative movement of the fluid. Such monitors suffer from the disadvantage that in some environments, for example, an underground coal mine, they are susceptible to mechanical damage or the vane can become contaminated with dust.

Other types of fluid monitor rely on vortex shedding ie the vortices produced in a flowing fluid when an obstruction is placed in the fluid flow. The rate of vortex production tends to be proportional to the velocity of the fluid relative to the obstruction and for certain ranges this proportionality will be a near approximation to linear.

These types of fluid flow monitor can detect the vortices produced in a variety of ways. For example strain gauges can sense strain in members disposed in the fluid, which strain is caused by the vortices. Piezoelectric crystals, heated wires and thermistors, and diaphrams also can be used to detect the vortices.

Alternatively, a sonic signal is projected from a transmitter to a sonic receiver, the path of the sonic signal intersecting the vortex trail. Electrical circuitry converts the received sonic signal into an electrical signal and detects from this signal the frequency of the vortices which modulated the sonic signal.

In particular, although not exclusively, the present invention concerns improvements in or relating to a fluid flow monitor comprising transducer means which is disposable in a fluid flow, the transducer means being constructed to derive an electrical signal including modulations associated with vortices produced in the fluid flow, processing circuit means for processing the electrical signal and deriving a further electrical signal dependent upon the fluid flow, and comparator means for comparing said further electrical signal with a preselected reference signal, the comparator means having an output dependent upon the comparison with said preselected reference signals, which output is arranged to control said processing circuit means in response to the comparison.

British patent application No. GB 2 020 022A further discloses according to another aspect a fluid flow monitor of a type wherein a sonic transmitter transmits a sonic signal into the fluid flow and a sonic receiver receives the sonic signal, the sonic signal being modulated by vortices in the fluid flow, the monitor comprising transducer means associated with the sonic receiver for converting the received sonic signal to an electrical signal modulated at the frequency of passage of the vortices, demodulating means for demodulating the electrical signal, processing means for producing a further electrical signal from the demodulated signal, the further signal having magnitude dependent upon the modulation frequency of the electrical signal and comparator means for comparing said further electrical signal with a preselected reference signal, the comparator means being arranged to have an output dependent upon the comparison with said preselected reference signal, and the output of the comparator means being arranged to control said processing circuit means in response to the comparison.

With such a monitor the sonic transmitter and the sonic receiver are arranged on opposite sides of a passage for the fluid flow. Typically, at least a portion of the opposite sides of the fluid flow passage are inclined outwardly in the direction of fluid flow.

It has been found that such fluid flow monitors give accurate and reliable results over a limited range of fluid flow, for example, at relatively low fluid flow velocity but tend to give relatively inaccurate or unreliable results at fluid flow velocities falling outside said limited range of fluid flow.

An object of the present invention is to provide an improved fluid flow monitor which is able to increase the range of fluid flow velocities over which accurate and reliable results are obtained.

According to the present invention a fluid flow monitor comprises a head portion defining a passage for fluid flow to be monitored, a vortex inducing element arranged at least part way across the passage, sensing means for sensing the vortices induced by the element and for deriving a signal indicative of the sensed vortices, and at least one formation associated with a side wall of the passage and tending to interfere with fluid flow along the passage, the formation being provided on the downstream side of the vortex inducing element.

Preferably, the formation tends to provide an obstruction to fluid flow in the vicinity of at least part of the sensing means.

Preferably, the passage defines a fluid flow inlet and a fluid flow outlet, the formation being adjacent to the fluid flow outlet.

Preferably, at least portions of the two opposed sides of the passage are relatively inclined outwardly in the direction of fluid flow along the passage.

Advantageously, two formations are provided, the formations being associated with the two opposed sides of the passage, respectively.

Conveniently, the formation is provided by having the means associated with a recessed part of the passage wall.

Preferably, the passage wall is stepped.

Preferably, the recess is provided by a grove formed in the passage wall.

Preferably, both the two opposed sides of the passage are recessed.

Conveniently, the sensing means comprises associated transmitter means and receiver means, the transmitter means and the receiver means being associated with the two opposed sides of the passage respectively.

Preferably, both the transmitter means and the receiver means are associated with recessed parts of the passage wall.

Advantageously, the sensing means comprises transmitter means arranged to emit a vortex sensing signal into the passage towards the induced vortices, at least a section of the path of the emitted vortex sensing signal being inclined relatively to the direction of fluid flow along the passage and generally being directed upstream relatively to the transmitter means.

Preferably, the receiver means for receiving the emitted vortex sensing signal is mounted on the side of the passage remote from the transmitter means, the receiver means not being in direct alignment with the transmitter means, the path of the emitted vortex sensing signal being non linear.

Advantageously, the emitted vortex sensing signal is directed by the transmitter means towards a reaction zone adajacent to the vortex inducing element.

Conveniently, the associated sides of the fluid flow passage are inclined inwardly in the direction of fluid flow along the passage.

Conveniently, the section of the path of the vortex sensing signal emitted from the transmitter means substantially is normal to the associated side of the passage.

Conveniently, the section of the path of the vortex sensing signal received by the receiver means substantially is normal to the associated side of the passage.

Alternatively, the associated sides of the passage substantially are parallel to the fluid flow along the passage.

Alternatively, the associated sides of the passage are relatively inclined outwardly in a direction of fluid flow along the passage.

Preferably, the transmitter means is a sonic transmitter arranged to transmit a sonic signal across the passage and the receiver means is a sonic receiver arranged to receive the sonic signal, the received sonic signal being modulated by the induced vortices in the fluid flow.

By way of example only, nine embodiments of the present invention will be described with reference to the accompanying drawings, in which:

In FIGS. 1 to 5 like parts in each figure have been given the same reference numbers.

Figure 1:
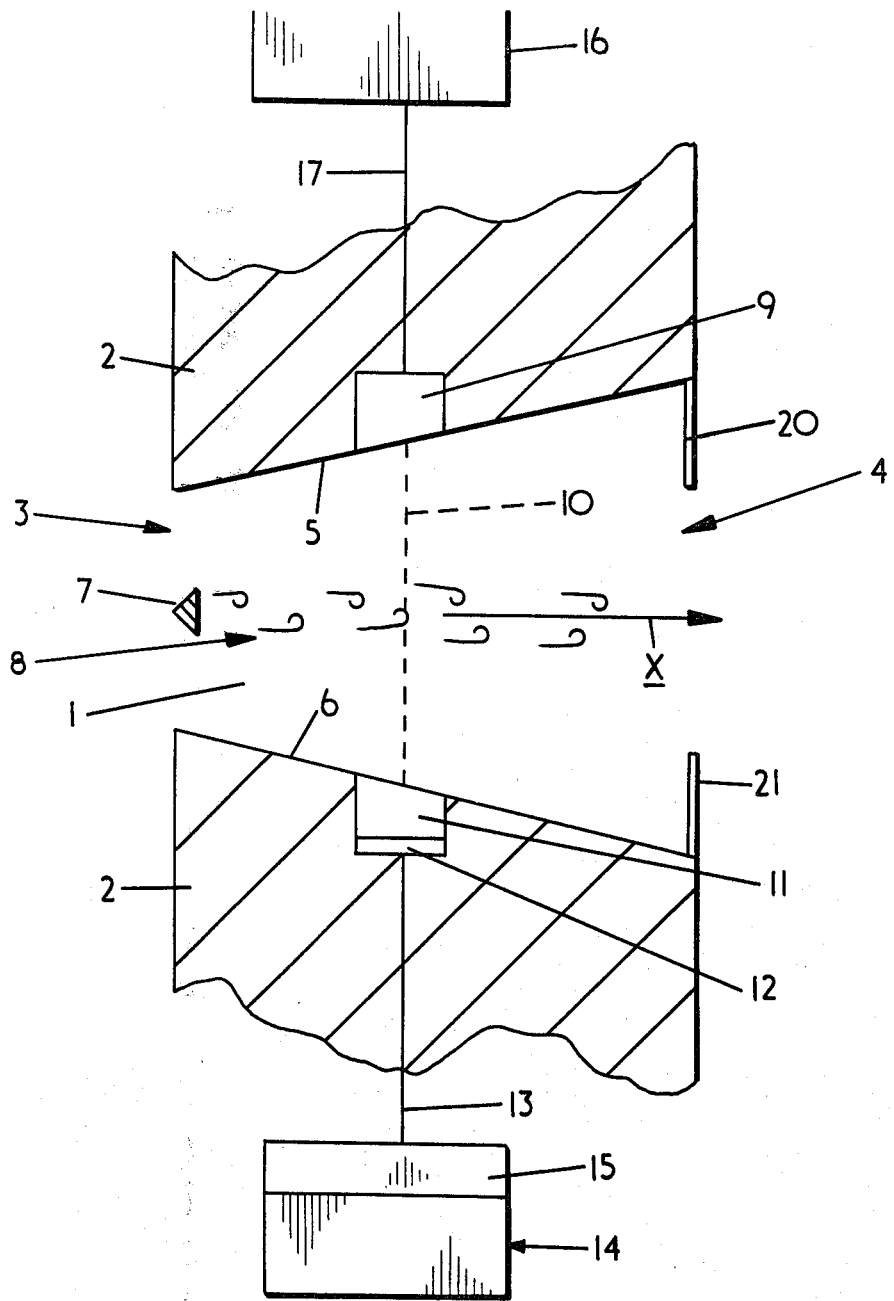
FIG. 1 is a diagrammatic sectional view taken through a head portion of a fluid flow monitor constructed in accordance with a first embodiment of the present invention.

Referring to FIG. 1 of the drawings which shows a diagrammatic sectional view substantially taken vertically along the longitudinal axis of a fluid flow passage 1 defined by a head portion 2 of a fluid flow monitor constructed in accordance with a first embodiment of the present invention. The passage has a fluid flow inlet 3 and a fluid flow outlet 4 and two opposed side walls 5 and 6 which are relatively inclined outwardly in the direction of fluid flow along the passage. The direction of fluid flow along the passage is indicated by arrow X.

In use, the monitor is situated in a fluid flow to be sensed such that the inlet 3 faces directly at the fluid flow. In one example the monitor is used to determine the velocity of mine air flowing along an underground roadway in a mine, the monitor being installed in the roadway such that the inlet faces directly along the roadway in order that the mine air can flow straight through the monitor.

The monitor also comprises a vortex inducing element 7 arranged at least part way across the passage in the vicinity of the inlet 3 As fluid, eg. mine air, flows around the element 7 a trail of Karman vortices 8 is induced along the passage downstream of the element, the induced vortex trail pattern being indicative of the fluid velocity flowing along the passage. The vortex trail 8 is sensed be sensing means comprising a sonic transmitter 9 in one wall 5 arranged to direct a sonic signal 10 across the passage and the Karman vortex trail 8 to sonic receiver 11 associated with the passage side wall 6.

The amplitude of the sonic signal is modulated by its interference with the vortex trail.

The sonic receiver 11 includes electrical transducer means 12 which derives an electrical signal indicative of the received sonic signal, the derived electrical signal being fed along line 13 to monitor means 14 including comparator means 15 adapted to compare the derived signal with a preselected signal enabling the monitor means to derive an electrical difference signal indicative of the velocity of fluid flowing along the passage. The electrical difference signal is fed to a record and/or display instrument which either records the sensed velocity and/or displays the velocity on, for example, a graduated meter. The record and/or display means may be part of the monitor means 14. Alternatively, the record and/or display means is remote from the monitor means.

The sonic transmitter 9 is fed with a suitable power supply from a power unit 16 via line 17. A similar power supply line (not shown) is fed to the sonic receiver 11.

The monitor also includes two formations 20 and 21 associated with the passage side walls 5 and 6, respectively, and each constituted by a projection extending into the passage thereby tending to provide an obstruction to fluid flow along the passage in the vicinity of the means 9, 11 for sensing the vortex trail 8. The formations 20, 21 are provided on the downstream side of the vortex inducing element and of the sensing means 9, 11. In the embodiment illustrated in FIG. 1 the formations 20 and 21 are located adjacent to the fluid flow outlet 4 and define an outlet substantially having the same area of cross section as the fluid flow inlet.

Figure 2:
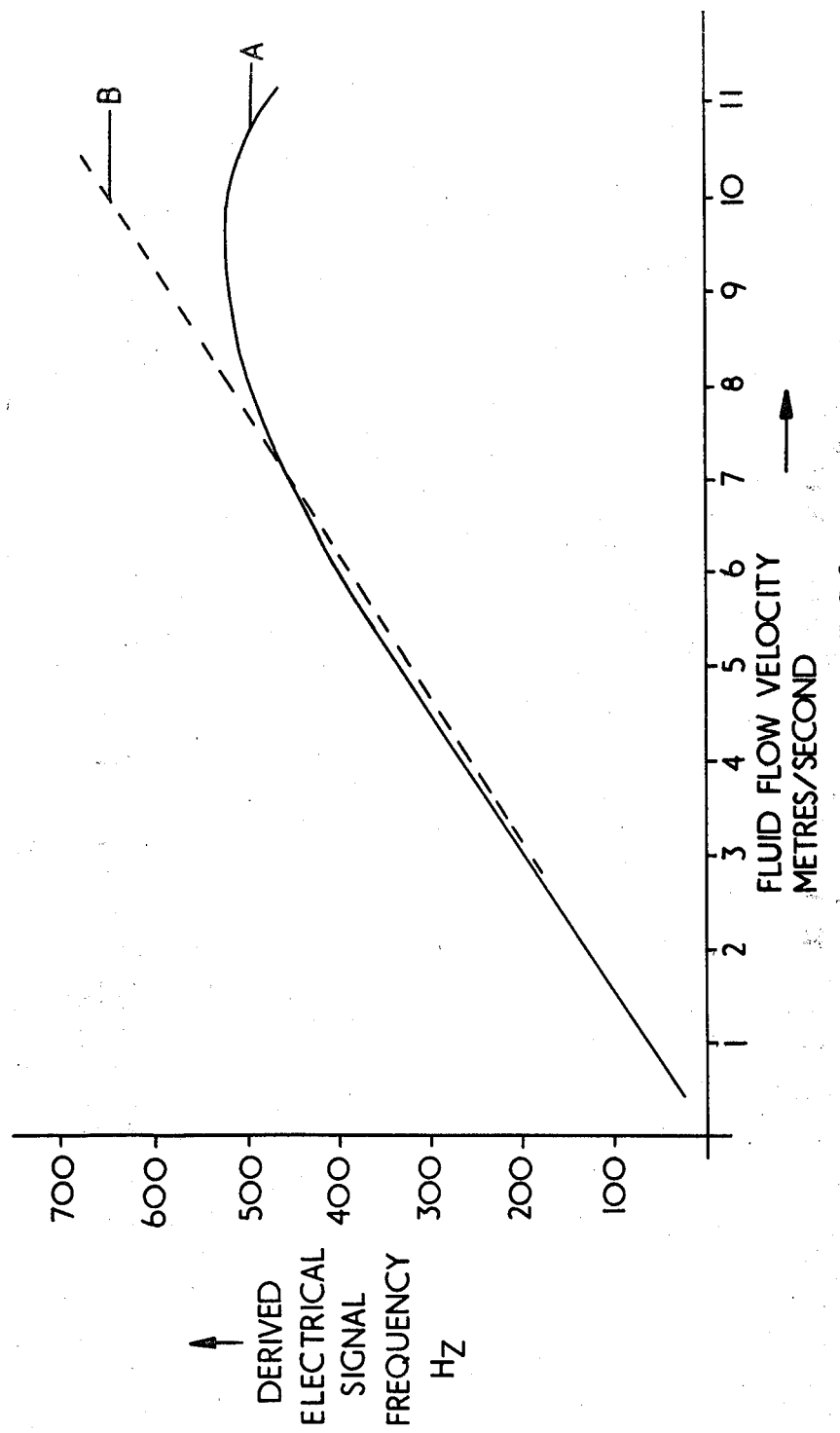
FIG. 2 shows calibration graphs A and B for two fluid flow monitors, graph B being the calibration graph for a fluid flow monitor constructed in accordance with the present invention.

Referring now to FIG. 2, this shows two calibration graphs A and B, associated with two different fluid flow monitors in which the vertical ordinate plots frequency in Hertz against the fluid flow velocity in meters per second and the horizontal ordinate. The monitor associated with graph A was somewhat similar to that illustrated in FIG. 1 but did not include the formations 20, 21 at the end of the passage 1. From FIG. 2 it can be seen that at relatively low fluid flow velocities, i.e. with a range 0.5 to 7 meters per second, the monitor had a substantially linear calibration graph. However, at increased fluid flow velocitites, i.e. over 7 meters per second, the calibration graph is not linear and at velocities above 9 meters per second the graph exhibits a downward trend. Thus, for a derived electrical signal of around 500 Hertz two possible readings of fluid flow are possible. Consequently, such a fluid flow monitor is unsuitable for sensing fluid flows over 7 meters per second. Such a limitation greatly reduces the operational scope of the monitor.

Graph B of FIG. 2 shows the calibration graph associated with a fluid monitor constructed as illustrated in FIG. 1 and including the two formations 20 and 21. As seen in FIG. 2 Graph B is linear throughout the desired operational range of fluid flow, i.e. from 0.5 meters per second to up to 10 meters per second. Thus, it will be appreciated that a fluid flow monitor constructe in accordance with the present invention increases the operational range of fluid flow velocities thereby providing a greatly inproved monitor.

In addition, in practice the fluid flow monitor constructed in accordance with the present invention tends to be less troublesome to set up than the prior known monitors of the vortex shedding type, the selected operational frequency of the sonic signal is less critical thereby greatly reducing the initial setting up procedure. Typically, the operational frequency of the sonic signal lies in a range 140 to 160 KHz.

Figure 3:
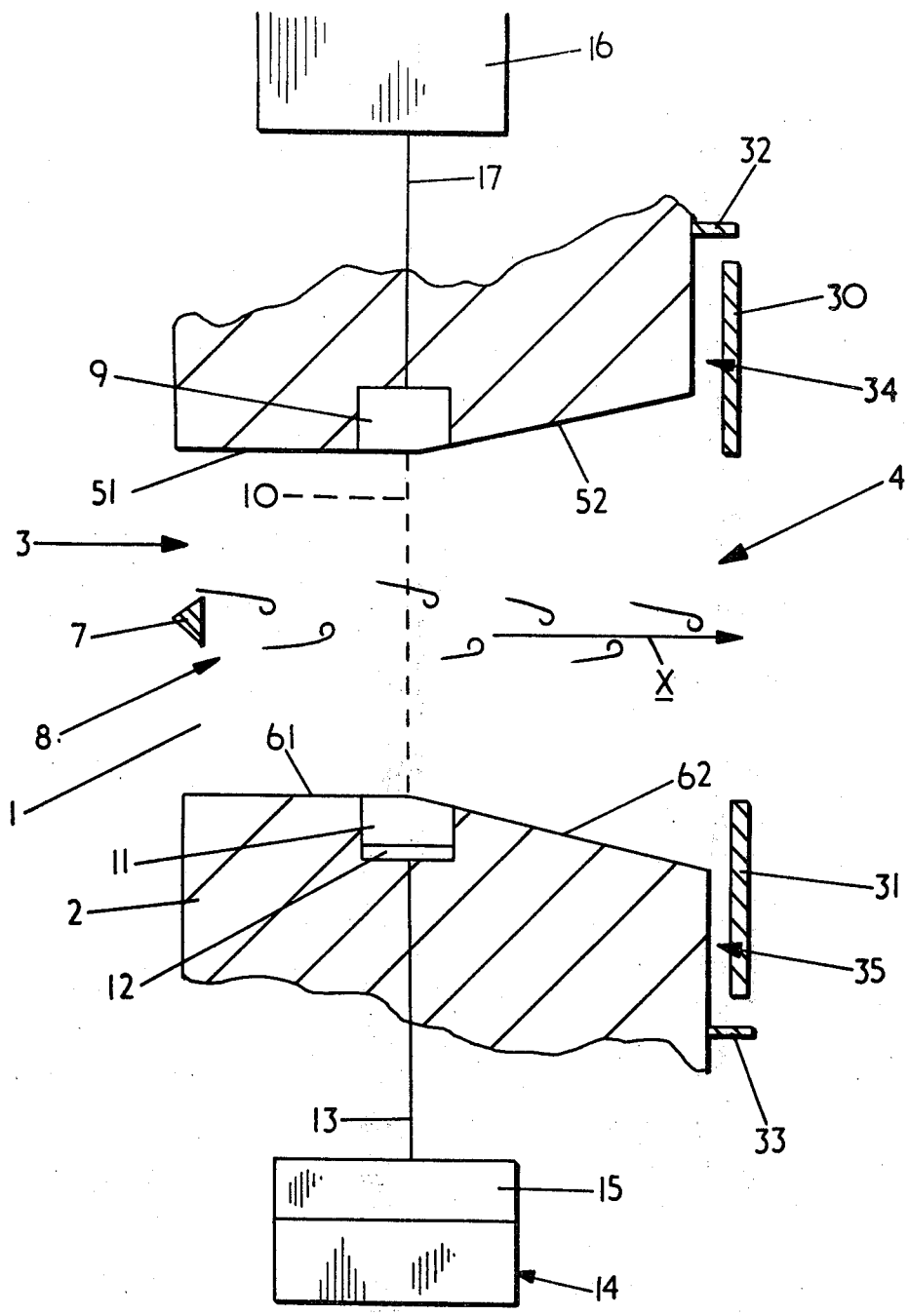
FIG. 3 is a diagrammatic sectional view taken through a head portion of a fluid flow monitor constructed in accordance with a second embodiment of the present invention.

FIG. 3 illustrates a second embodiment of fluid flow monitor constructed in accordance with the present invention.

The monitor shown in FIG. 3 to which reference is now made differs from the first described embodiment because the formations 20 and 21 which abutted to side walls 5 and 6, respectively, have been replaced by formations 30 and 31 which are constituted by projections suitably supported and spaced from the associated side walls to define tortuous paths which tend to provide obstructions to fluid flow along the passage in the vicinity of the sensing means 9, 11 but which provide escape channels 34 and 35 for any dust particles which otherwise may have tended to gather in the pockets defined by the formations. Consequently, dust settling on the side walls will tend to be swept by the fluid flow through the escape channels 34 and 35 existing between the formations 30 and 31 and the associated side walls, thereby tending to increase the operational life of the monitor in dusty conditions such as may be expected in a coal mine. The formations 30 and 31 also include guide elements 32 and 33 respectively, provided adjacent to the outlets of the associated escape channel.

In another embodiment (not shown) only the formation associated with the lower side wall of the passage is spaced from the side wall.

The passage 1 in FIG. 3 is shown to comprise a parallel sided section 51, 61 adjacent to the pasage inlet 3 and an outwardly inclined section 52, 62 adjacent to the passage outlet 4.

Figure 4:
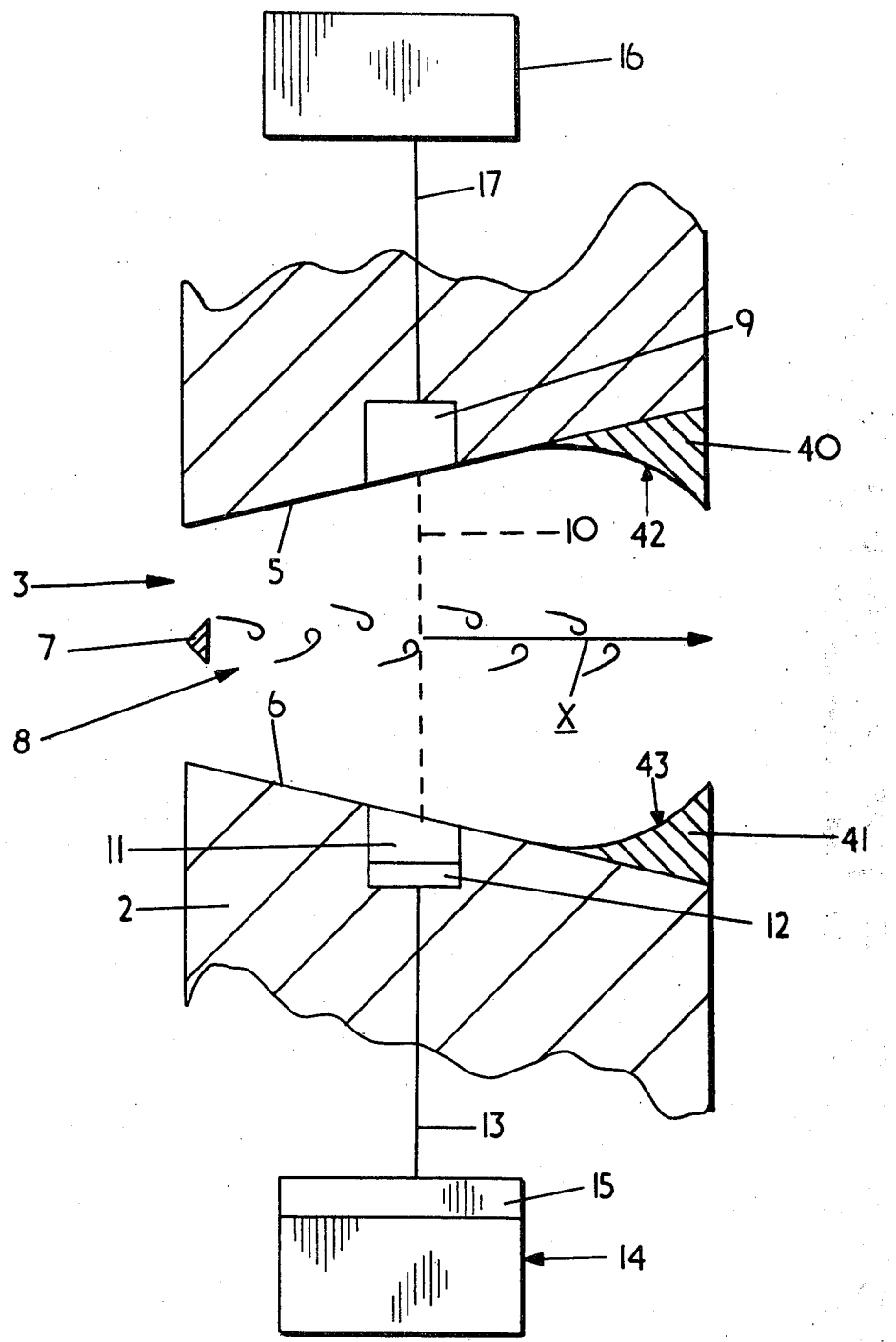
FIG. 4 is a diagrammatic sectional view taken through a head portion of a fluid flow monitor constructed in accordance with a third embodiment of the present invention.

FIG. 4 illustrates a third embodiment of the present invention. The formations 40 and 41 are constituted by projections arranged to abut the associated side walls 5 and 6 respectively. However, the inward facing surfaces 42 and 43 of the formations are curved thereby tending to ensure that any dust particles tending to settle on the side walls 5 and 6 are swept by the fluid flow and carried towards the outlet 4 thus increasing the operational life of the monitor in dusty conditions.

This embodiment of the present invention may be modified by providing only one of the formations with an inward facing curved surface or in providing only one curved formation.

In a further modification more than two formations can be provided.

Figure 5:
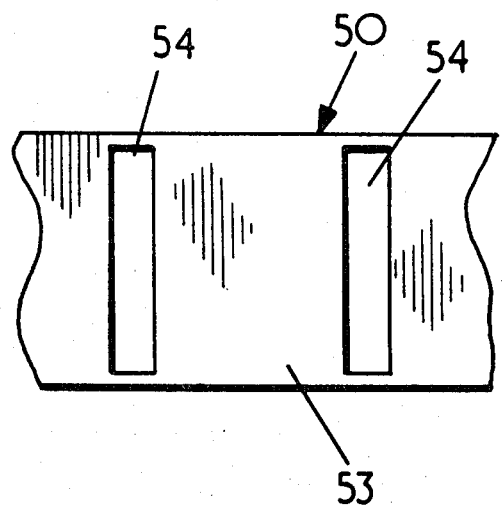
FIG. 5 is a diagrammatic cross-sectional view taken through a detail of a head portion of a fluid flow monitor constructed in accordance with a fourth embodiment of the present invention.

FIG. 5 shows a part of a formation 50 of a fourth embodiment of the present invention, the formation 50 being viewed in a direction along the fluid flow passage. As seen in the drawing, the formation comprises a screen 53 which tends to provide an obstruction to fluid flow along the passage in the vicinity of the means for sensing the vortex trail. However, the screen is provided with a number of apertures 54 tending to provide escape means for dust particles which otherwise might be trapped by the formation 50

In further embodiments of the invention only portions of the passage side walls are relatively inclined outwardly in the direction of the fluid flow, for example the opposed passage side walls may be parallel upstream of the sensing means 9, 11 for sensing the vortex trail 8. Alternatively, portions of the opposed side walls may be inclined outwardly in a direction opposite to the direction of fluid flow, for example the portion of the opposed side walls upstream of the sensing means 9, 11 for sensing the vortex trail 8.

In other embodiments of the invention opposed side walls of the passage are parallel. The passage may also be tubular.

In still other embodiments of the invention the formation tending to provide an obstruction to fluid flow is integral with the monitor head defining the passage.

In the embodiments therebefore described and illustrated, the formations are disclosed as being downstream of the sensing means. The invention will also operate effectively if the formations are located between the element and the sensing means.

Figure 6:
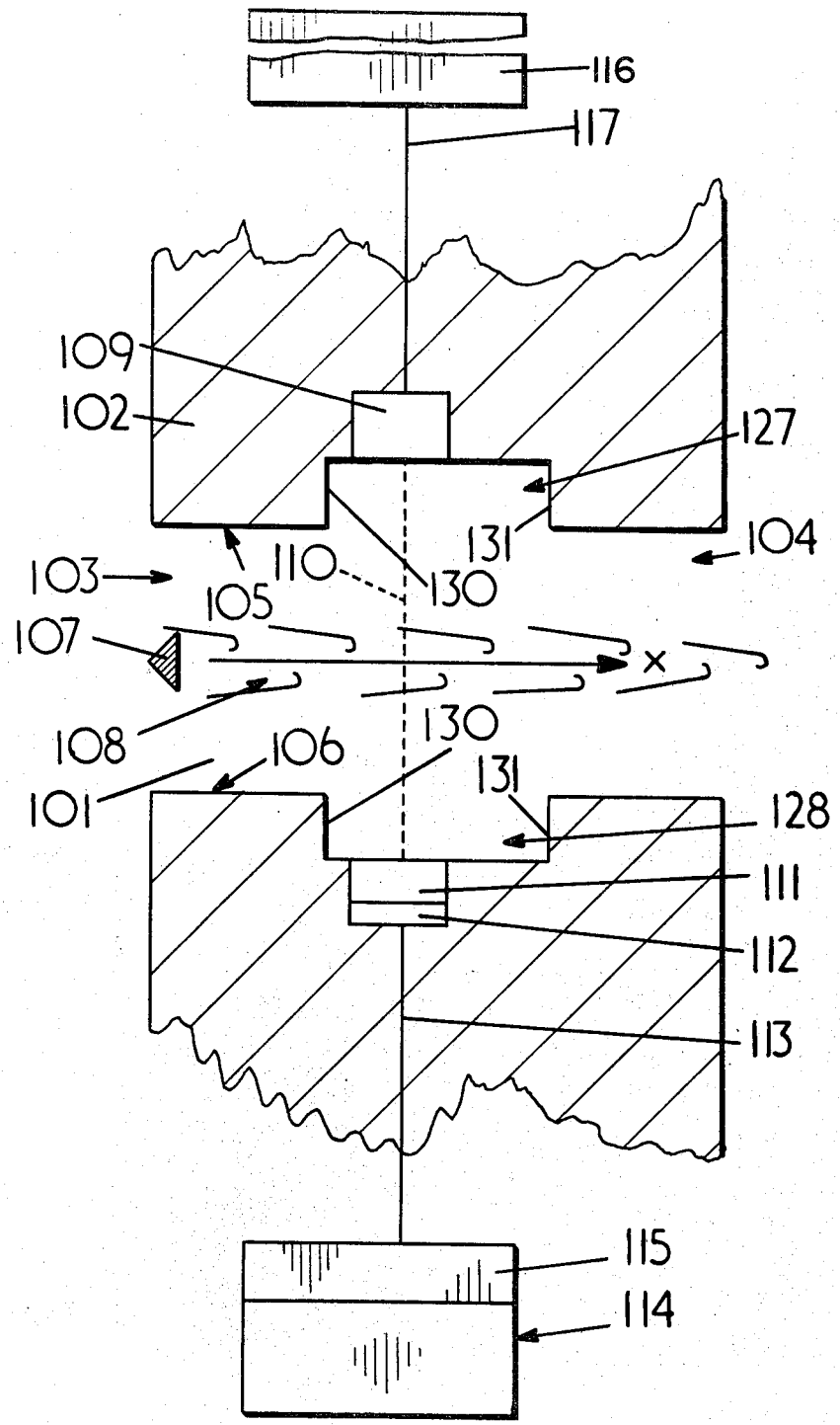
FIG. 6 is a diagrammatic sectional view taken through a head portion of a fluid flow monitor constructed in accordance with a fifth embodiment of the present invention.

Referring now to FIG. 6 of the drawing which shows a diagrammatic sectional view substantially taken along a plane including the longitudinal axis of a fluid flow passage 101 defined by a head portion 102 of a fluid flow monitor constructed in accordance with a fifth embodiment of the present invention. The passage has a fluid flow inlet 103 and a fluid flow outlet 104 and the passage wall includes two opposed sides 105 and 106. The direction of fluid flow along the passage is indicated by arrow X.

In use, the monitor is situated in a fluid flow to be sensed such that the inlet 103 faces directly at the fluid flow. In one example the monitor is used to determine the velocity of mine air flowing along an underground roadway in a mine, the monitor being installed in the roadway such that the inlet faces directly along the roadway.

The monitor also comprises a vortex inducing element 107 arranged at least part way across the passage in the vicinity of the inlet 103. As fluid eg mine air, flows around the element 107 a trail of Karman vortices 108 is induced along the passage downstream of the element, the induced vortex trail pattern being indicative of the fluid velocity flowing along the passage. The vortex trail existing in the passage is sensed by means comprising a sonic transmitter 109 arranged to direct a sonic signal 110 into the passage in the vicinity of the Karman vortex trail 108. A sonic receiver 111 associated with the passage side 106 is arranged to receive the sonic signal 110 after it has traversed through the vortex trail, the amplitude of the signal being modulated by its interference with the vortex trail.

The sonic receiver 111 includes electrical circuit means 112 which derives an electrical signal indicative of the received sonic signal, the derived electrical signal being fed along line 113 to monitor means 114 including comparator means 115 adapted to compare the derived signal with a preselected signal enabling the monitor means to derive a further electrical signal indicative of the velocity of fluid flow along the passage. The further electrical signal is fed to a record and/or display instrument which either records the sensed velocity and/or displays the velocity on, for example, a graduated meter. The record and/or display means may be part of the monitor means 114. Alternatively, the record and/or display means is remote from the monitor means.

the sonic transmitter 109 is fed with a suitable power supply from a power unit 115 via line 117. A similar power supply line (not shown) is fed to the sonic receiver 111.

As seen in FIG. 6 the opposed sides 105 and 106 of the passage 101 are recessed by groves 127 and 128 respectively, the means 109, 111, for sensing the vortex trail being mounted within the associated recess such that, in use, a layer of substantially still or slow moving fluid tends to be retained in the vicinity of the means.

The longitudinal boundaries of the recesses 127 and 128 are defined by steps 130 131, the steps 130 being upstream of the means 109, 111 and the steps 131 being downstream of the means 109, 111.

In the case of a passage 101 having a substantially circular cross section the recesses could be formed by a substantially annular grove.

Alternatively, the recesses may be formed by slots provided in the passage sides and arranged traversely across the passage.

In use, a fluid flow monitor having a construction substantially as disclosed in FIG. 6 tends to have an increased operational range of fluid flow velocities thereby tending to provide an improved monitor.

In addition, in practice the fluid flow monitor substantially as constructed in FIG. 6 tends to be less troublesome to set up than the prior known monitors of the vortex shedding type, the selected operational frequency of the sonic signal is less critical thereby greatly reducing the initial setting up procedure. Typically the operational frequency of the sonic signal lies within a range 140 to 160 KHz.

Figure 7:
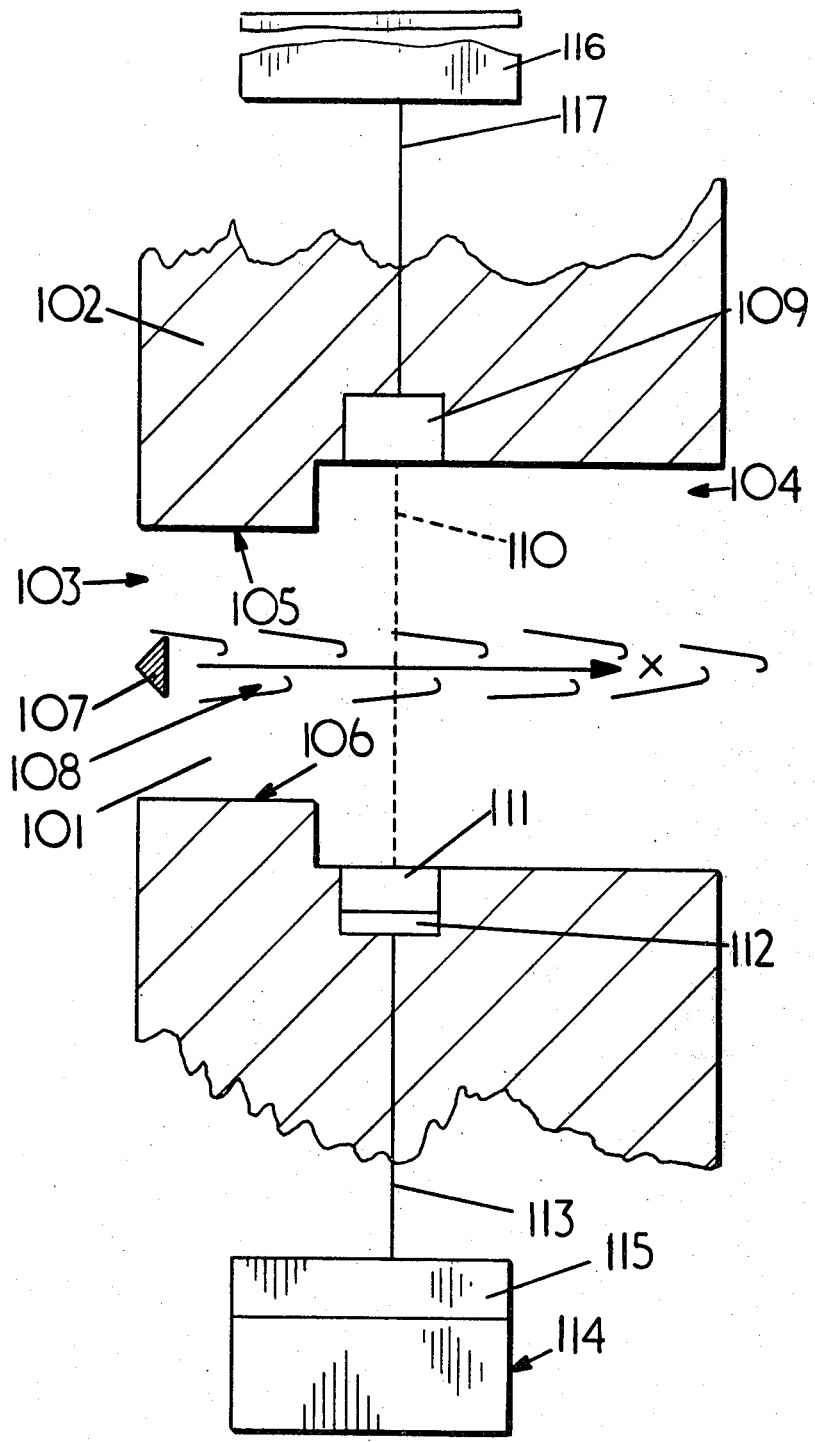
FIG. 7 is a diagrammatic sectional view taken through a head portion of a fluid flow monitor constructed in accordance with a sixth embodiment of the present invention.

FIG. 7 shows a sixth embodiment of the present invention, FIG. 7 being somewhat similar to FIG. 6 and the same reference numbers have been used for similar items.

As seen in FIG. 7 the passage 101 has two opposed sides 105 and 106 which are recessed to form an enlarged passage cross-sectional area, the means 109, 111 for sensing the vortex trail 108 is mounted within the recessed portions of the passage.

The boundary of the recesses are defined by steps 140 located upstream of the means 109, 111 such that in use a layer of still one relatively slow moving fluid tends to be created in the vicinity of the means 109, 111.

In other embodiments of the present invention formation is provided which extend into the passage tending to provide an obstruction to fluid flow along the passage in the vicinity of the means for sensing the vortex trail.

In other embodiments of the present invention only one of the passage sides 105 or 106 is recessed.

Figure 8:
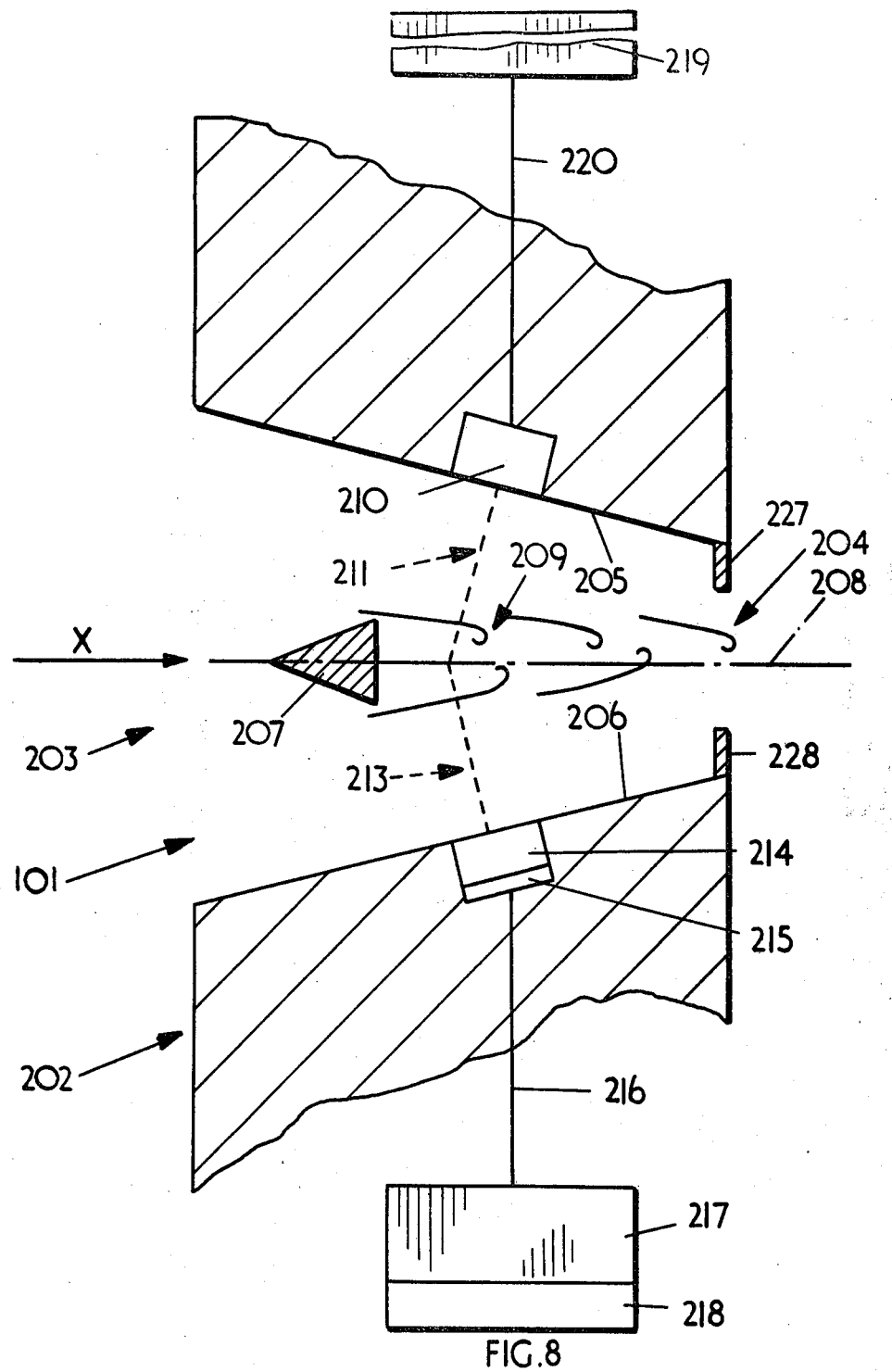
FIG. 8 is a diagrammatic sectional view taken through a head portion of a fluid flow monitor constructed in accordance with a seventh embodiment of the present invention.

Referring to FIG. 8 of the drawings which shows a diagrammatic sectional view substantially taken vertically along the longitudinal axis of a fluid flow passage 201 defined by a head portion 202 of a fluid flow monitor constructed in accordance with a seventh embodiment of the present invention. The passage has a fluid flow inlet 203 and a fluid flow outlet 204 and two opposed side walls 205 and 206 which are relatively inclined inwardly in the direction of fluid flow along the passage. The direction of fluid flow along the passage is indicated by arrow X and the longitudinal axis of the passage is indicated by broken line 208.

In use, the monitor is situated in a fluid flow to be sensed such that the inlet 203 faces directly at the fluid flow. In one example the monitor is used to determine the velocity of mine air flowing along an underground roadway in a mine, the monitor being installed in the roadway such that the inlet faces directly along the roadway in order that the mine air can flow straight through the monitor.

The monitor also comprises a vortex inducing element 207 arranged at least part way across the passage in the vicinity of the inlet 203. As fluid eg mine air flow around the element a trail of Karman vortices 209 is induced along the passage downstream of the element, the induced vortex trail pattern being indicative of the fluid velocity flowing along the passage. The vortex trail 209 is sensed by sensing means comprising a sonic transmitter 210 mounted in one wall 205 of the passage and arranged to direct an emitted, vortex sensing sonic signal along a section 211 of a path across the passage and toward the Karman vortex trail 209. The section 211 of the sensing signal path is inclined relatively to the direction of fluid flow and generally is directed upstream relative to the sonic transmitter 210. In the embodiment shown in FIG. 8 the section 211 of the path substantially is normal to the associated passage side wall 205.

The amplitude of the emitted sonic sensing signal is modulated by its interference with the vortex trail. In addition, path of the emitted sonic sensing signal is deflected by the interference with the vortex trail into a section of path 213 directed at a sonic receiver 214, the section 213 substantially being normal to the passage side wall 206. The action of the induced vortices as it deflects the path of the emitted sonic sensing signal is to effectively increase the amount by which the amplitude of the sensing signal is modulated as the pattern of the induced vortex trail varies. Thus, the sensing means, ie the transmitter and receiver, tend to be more sensitive in detecting changes in fluid flow velocity.

The sonic receiver 214 includes electrical transducer means 215 which derives an electrical signal indicative of the received sonic signal, the derived electrical signal being fed along line 216 to monitor means 217 including comparator means 218 adapted to compare the derived signal with a preselected signal enabling the monitor means to derive an electrical difference indicative of the velocity of fluid flowing along the passage. The electrical difference signal is fed to a record and/or display instrument which either records the sensed velocity and/or displays the velocity on, for example, a graduated meter. The record and/or display means may be part of the monitor means 217. Alternatively, the record and/or display means is remote from the monitor means.

The sonic transmitter 210 is fed with a suitable power supply from a power unit 219 via line 220. A similar power supply line (not shown) is fed to the sonic receiver 214 and associated monitoring and processing equipment.

The fluid flow monitor also includes two shield formations 227 and 228 associated with the passage side walls 205 and 206 respectively, and each constituted by a projection extending into the passage thereby tending to provide an obstruction to fluid flow along the passage in the vicinity of the sensing means 210 and 214 for sensing the vortex trail. The formations 227 and 228 are provided on the downstream side of the vortex inducing element 207 and of the sensing means 210 and 214. In the embodiment illustrated in FIG. 8 the formations 227 and 228 are located adjacent to the fluid flow outlet 204 and define the associated boundaries of the outlet.

Figure 9:
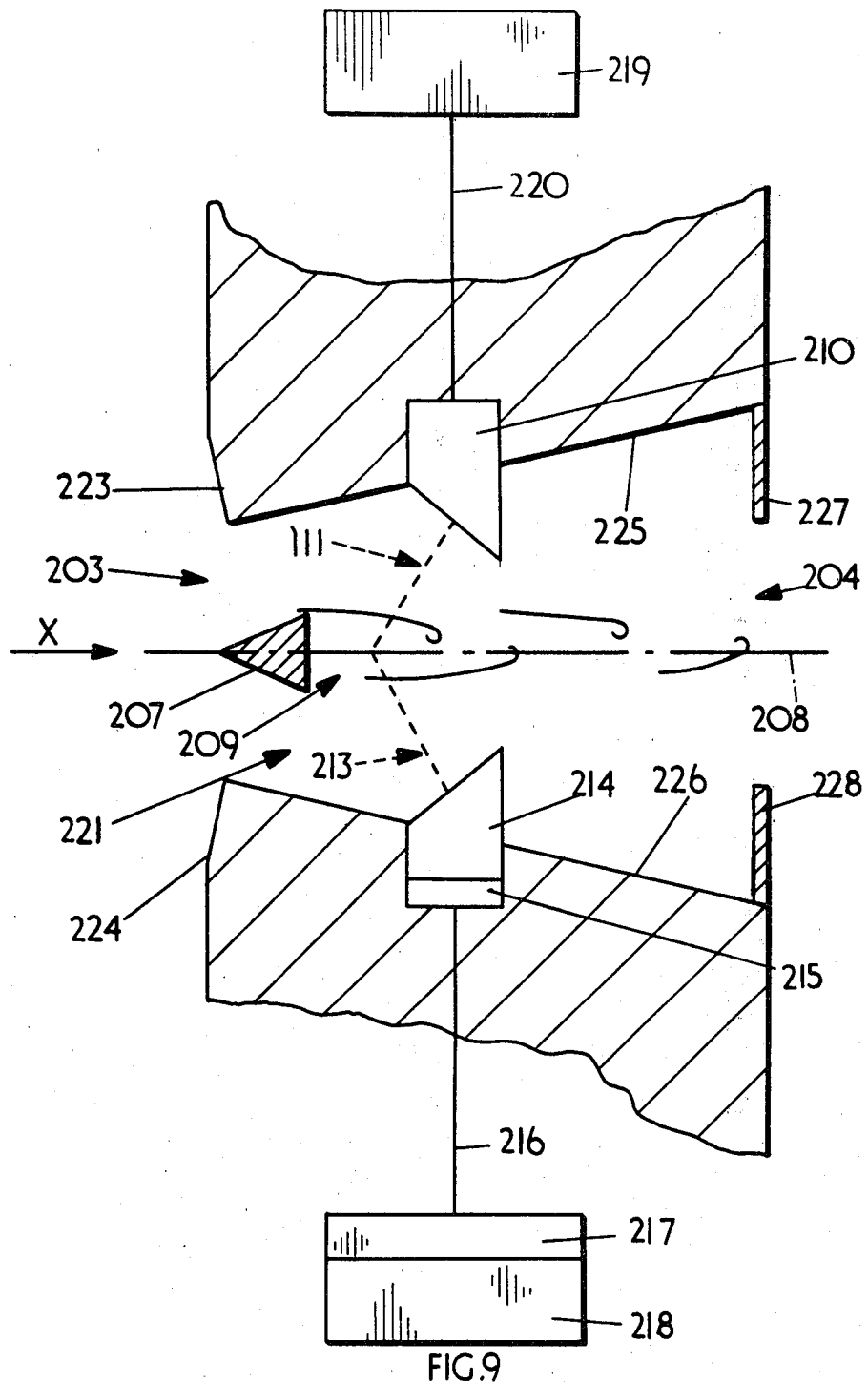
FIG. 9 is a diagrammatic sectional view taken through a head portion of a fluid flow monitor constructed in accordance with an eighth embodiment of the present invention.

FIG. 9 illustrating a eighth embodiment of the present invention, is a similar diagrammatic sectional view to FIG. 8. However, in FIG. 9 the side walls 225 and 226 of the passage 221 are relatively inclined outwardly in the direction of fluid flow along the passage. The shield formations 227 and 228 define an outlet substantially having the same area of cross section as the fluid flow inlet. The inlet 203 is provided with inwardly tapered guide walls 223 and 224.

Figure 10:
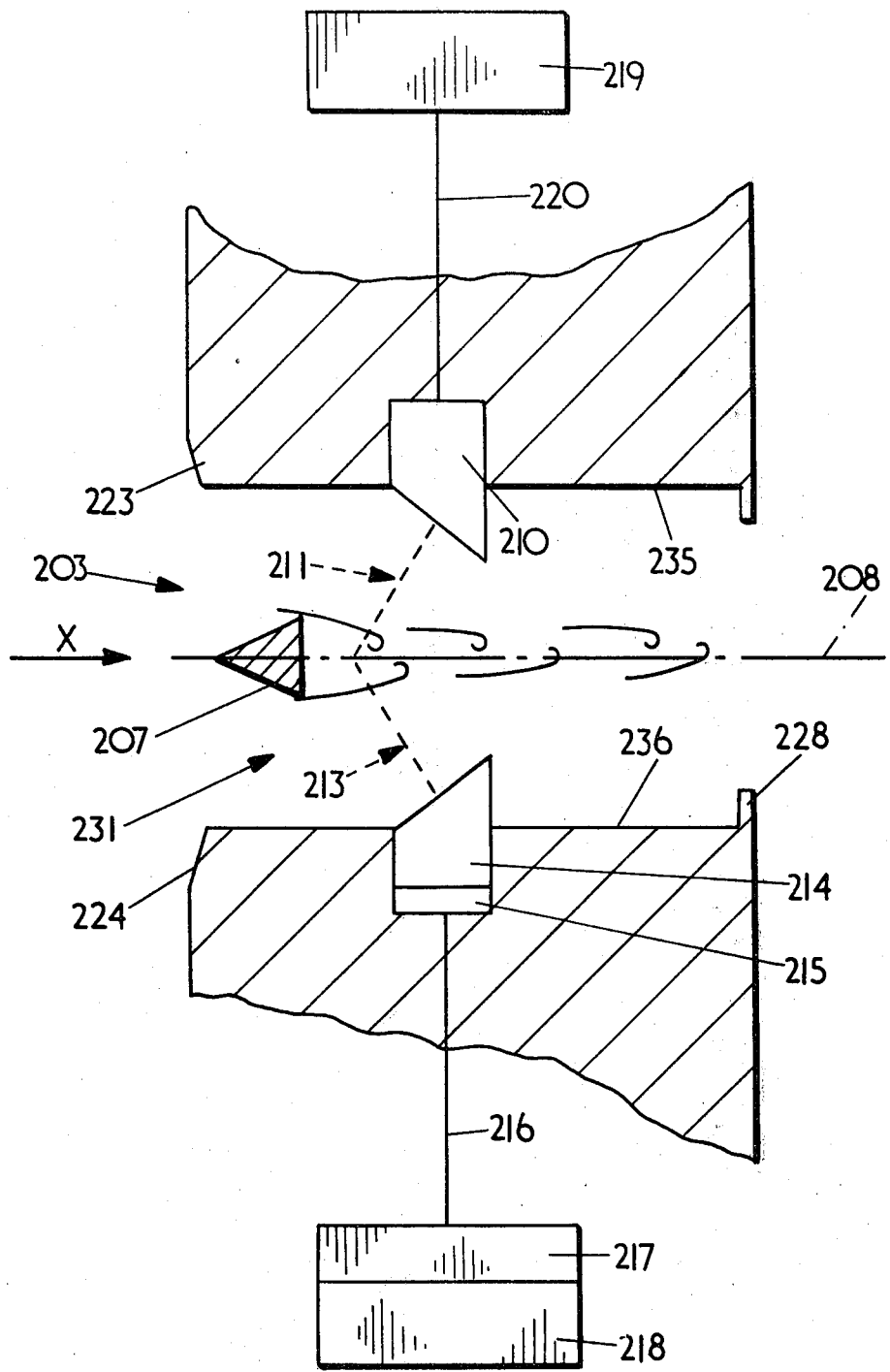
FIG. 10 is a diagrammatic sectional view taken through a head portion of a fluid flow monitor constructed in accordance with a ninth embodiment of the present invention.

FIG. 10 illustrating a ninth embodiment of the present invention is a similar diagrammatic sectional view to FIG. 8. However, in FIG. 10, the side walls 235 and 236 of the passage 231 substantially are parallel to the longitudinal axis 238 of the passage.

In the embodiments therebefore described and illustrated, the shield formations are disclosed as being downstream of the sensing means. The invention will also operate effectively if the shield formations are located between the element 207 and the sensing means 210, 214.

In other embodiments of the invention the shield formations are dispensed with and at least one passage side may be recessed.

I claim:

1. A fluid flow monitor comprising a head portion defining a passage for fluid flow to be monitored, a vortex inducing element arranged at least part way across the passage, sensing means for sensing the vortices induced by the element and for deriving a signal indicative of the sensed vortices, and at least one formation associated with a side wall of the passage and tending to interfere with fluid flow along the passage, the formation being provided on the downstream side of the vortex inducing element, in which the formation is provided by having the sensing means associated with a recessed part of the passage wall.

2. A fluid flow monitor as claimed in claim 1, in which the formation tends to slow to fluid flow in the vicinity of at least part of the sensing means.

3. A fluid flow monitor as claimed in claim 1, in which two formations are provided, the formations being associated with the two opposed sides of the passage, respectively.

4. A fluid flow monitor as claimed in claim 1, in which the passage wall is stepped.

5. A fluid flow monitor as claimed in claim 4, in which the recess is provided by a groove formed in the passage wall.

6. A fluid flow monitor as claimed in claim 5, in which both the two opposed sides of the passage are recessed.

7. A fluid flow monitor as claimed in claim 6, in which the sensing means comprises associated transmitter means and receiver means, the transmitter means and the receiver means being associated with two opposed sides of the passage respectively.

8. A fluid flow monitor as claimed in claim 7, in which both the transmitter means and the receiver means are associated with recessed parts of the passage wall.

9. A fluid flow monitor as claimed in claim 1, in which the sensing means comprises transmitter means arranged to emit a vortex sensing signal into the passage towards the induced vortices.

10. A fluid flow monitor as claimed in claim 9, in which a receiver means for receiving the emitted vortex sensing signal is mounted on the side of the passage remote from the transmitter means.

11. A fluid flow monitor as claimed in claim 10, in which the section of the path of the vortex sensing signal emitted from the transmitter means substantially is normal to the associated side of the passage.

12. A fluid flow monitor as claimed in claim 11, in which the section of the path of the vortex sensing signal received by the receiver means substantially is normal to the associated side of the passage.

13. A fluid flow monitor as claimed in claim 12, in which the associated sides of the passage substantially are parallel to the fluid flow along the passage.

14. A fluid flow monitor as claimed in claim 1, in which the transmitter means is a sonic transmitter arranged to transmit a sonic signal across the passage and the receiver means is a sonic receiver arranged to receive the sonic signal, the received sonic signal being modulated by the induced vortices in the fluid flow.

* * * * *